United States Patent
Tang et al.

(10) Patent No.: US 12,237,460 B2
(45) Date of Patent: Feb. 25, 2025

(54) COMPOSITE MATERIAL, PREPARATION METHOD THEREOF AND LITHIUM ION BATTERY

(71) Applicant: Zhuhai CosMX Battery Co., Ltd., Zhuhai (CN)

(72) Inventors: Weichao Tang, Zhuhai (CN); Suli Li, Zhuhai (CN); Wei Zhao, Zhuhai (CN); Hao Yuan, Zhuhai (CN); Junyi Li, Zhuhai (CN); Yanming Xu, Zhuhai (CN); Pengjian Zuo, Zhuhai (CN)

(73) Assignee: ZHUHAI COSMX BATTERY CO., LTD. (CN)

( * ) Notice: Subject to any disclaimer, the term of this patent is extended or adjusted under 35 U.S.C. 154(b) by 729 days.

(21) Appl. No.: 17/391,288

(22) Filed: Aug. 2, 2021

(65) Prior Publication Data

US 2021/0359337 A1  Nov. 18, 2021

Related U.S. Application Data

(63) Continuation of application No. PCT/CN2020/080044, filed on Mar. 18, 2020.

(30) Foreign Application Priority Data

Mar. 18, 2019  (CN) .......................... 201910204698.1

(51) Int. Cl.
*H01M 10/0525* (2010.01)
*H01M 4/04* (2006.01)
(Continued)

(52) U.S. Cl.
CPC ..... *H01M 10/0525* (2013.01); *H01M 4/0407* (2013.01); *H01M 4/364* (2013.01); *H01M 10/0562* (2013.01); *B82Y 40/00* (2013.01)

(58) Field of Classification Search
CPC ........... H01M 10/0525; H01M 4/0407; H01M 4/364; H01M 10/0562
(Continued)

(56) References Cited

FOREIGN PATENT DOCUMENTS

| CN | 104577082 A | 4/2015 |
| CN | 105283414 A | 1/2016 |

(Continued)

OTHER PUBLICATIONS

Lan, Ye et al., Fabrication of nano-sized attapulgite-based aerogels as anode material for lithium ion batteries, Journal of Material Science, 2017, pp. 2054-2064/.
(Continued)

*Primary Examiner* — Jonathan G Leong
*Assistant Examiner* — John S Medley
(74) *Attorney, Agent, or Firm* — Dilworth IP, LLC (57) ABSTRACT

The present application provides a composite material and a preparation method thereof, and a lithium ion battery, and belongs to the technical field of lithium batteries. A specific solution is as follows: the composite material is an oxide electrolyte coated nano-attapulgite composite material, where a coating layer of an oxide electrolyte has a thickness less than or equal to 20 μm, a rod crystal of a nano-attapulgite has a length of 100 nm-50 μm and a width of 10 nm-120 nm, and the nano-attapulgite is an organically modified natural nano-attapulgite and/or a lithium cation exchanged natural nano-attapulgite. The attapulgite composite material coated with the oxide electrolyte has a rod-shaped fast lithium ion transmission channel at a nanometer level, which can improve a transmission of lithium ions and has good lithium ion conductivity and excellent mechanical properties.

15 Claims, 1 Drawing Sheet

(51) Int. Cl.
  *H01M 4/36* (2006.01)
  *H01M 10/0562* (2010.01)
  *B82Y 40/00* (2011.01)

(58) Field of Classification Search
  USPC .......................................................... 429/231
  See application file for complete search history.

(56) References Cited

FOREIGN PATENT DOCUMENTS

| | | | | |
|---|---|---|---|---|
| CN | 105684205 | A | | 6/2016 |
| CN | 105914326 | A * | 8/2016 | .......... H01M 50/403 |
| CN | 106215966 | A | | 12/2016 |
| CN | 108155324 | A | | 6/2018 |
| CN | 108206277 | A * | 6/2018 | ........ H01M 10/0525 |
| CN | 108511662 | A | | 9/2018 |
| CN | 108550906 | A | | 9/2018 |
| CN | 108878968 | A * | 11/2018 | ........ H01M 10/0565 |
| CN | 109037550 | A * | 12/2018 | .......... H01M 10/052 |
| CN | 109065815 | A * | 12/2018 | ........ H01M 10/0525 |
| CN | 109755641 | A | | 5/2019 |
| CN | 108565479 | A * | 9/2019 | .......... H01M 4/9033 |
| EP | 3009399 | A1 | | 4/2016 |

OTHER PUBLICATIONS

Yao, Pengcheng et al., PVDF/Palygorskite Nanowire Composite Electrolyte for 4V Rechargeable Lithium Batteries with High Energy Density, Nano Letters, 2018, pp. 1-12.

European Search Report in EP Patent Application No. 20772592.0 dated May 6, 2022.

Huo, Chengli, Fundamental research on palygorskite-based functional composites, Full-text Database of Chinese Doctoral Dissertations Engineering Science and Technology 1 Series, Dec. 15, 2014.

First Office Action in CN Patent Application No. 201910204698.1 dated Oct. 9, 2020.

Notice of Allowance in CN Patent Application No. 201910204698.1 dated Apr. 22, 2021.

International Search Report in International Patent Application No. PCT/CN2020/080044 dated Jul. 2, 2020.

\* cited by examiner

COMPOSITE MATERIAL, PREPARATION METHOD THEREOF AND LITHIUM ION BATTERY

The present application is a National Stage of International Application No. PCT/CN2020/080044, filed on Mar. 18, 2020, which claims a priority to Chinese patent application No. 201910204698.1, filed on Mar. 18, 2019, and entitled "COMPOSITE MATERIAL, PREPARATION METHOD THEREOF AND LITHIUM ION BATTERY". The contents of the above applications are hereby incorporated by reference in their entireties.

TECHNICAL FIELD

The present application relates to the technical field of lithium ion batteries, and in particular, to a composite material, a preparation method thereof and a lithium ion battery.

BACKGROUND

Lithium ion batteries are widely used in digital products and power supplies because of high energy density and long service life thereof. However, an electrolyte of liquid lithium-ion batteries has some disadvantages such as volatility and low flash point, and there may be some safety problems such as leakage, inflammability and explosion during use. At the same time, under a background of increasing energy density demand, 350 Wh/kg may approach a limit of liquid lithium batteries, and a bottleneck of energy density becomes increasingly prominent. The safety performance and energy density limit an application scope of liquid lithium ion batteries.

Solid-state batteries have better safety and higher energy density, which is a development trend of lithium-ion batteries. At present, electrolyte systems of all-solid-state lithium ion batteries are divided into three types: polymer, oxide and sulfide. Oxide electrolyte has some problems such as poor interface contact and low conductivity, while sulfide electrolyte has some problems such as high cost, harsh production conditions and difficulty in large-scale production. Solid polymer electrolyte mainly includes polyether, polycarbonate, single ion conductor, etc., and is expected to break through a commercial application at the earliest, but there are some problems such as low lithium ion conductivity at present. Currently, a mainstream route of solid-state electrolyte is to use organic-inorganic composite polymer electrolyte and sulfide electrolyte. How to realize stable and rapid conduction of lithium ions in a positive electrode and a solid-state electrolyte of solid-state batteries and improve the overall performance of the solid-state batteries is a research focus of solid-state batteries.

In order to improve a performance of all-solid-state batteries, Chinese patent application No. CN201810400093.5 discloses an organic-inorganic composite electrolyte with a double-layer structure. A solid electrolyte includes oxide electrolyte, lithium salt, film former, lithium ion conducting polymer, plasticizer and solvent. A composite electrolyte membrane has good flexibility and high conductivity, but has some disadvantages such as thick thickness and poor compatibility with lithium metal. Chinese patent application No. CN201711328036.2 discloses an organic-inorganic composite solid electrolyte and a preparation method thereof, organic polymer and inorganic oxide solid electrolyte powder are compounded to increase a content of inorganic oxide solid electrolyte and improve a performance of solid batteries. At present, most oxides are mainly in a form of powder nanoparticles in solid-state battery applications, which have not been effectively improved, and properties thereof have not yet met requirements of industrial production and application.

SUMMARY

A first purpose of the present application is to provide a composite material. An attapulgite composite material coated with an oxide electrolyte has a rod-shaped fast lithium ion transmission channel at a nanometer level, which can improve a transmission of lithium ions and has good lithium ion conductivity and excellent mechanical properties.

A second purpose of the present application is to provide a preparation method of the composite material, which can improve a compatibility of a coated nano-attapulgite with a negative electrode material, a composite solid lithium ion electrolyte and a solid lithium ion positive electrode in a certain range, and improve a lithium ion conductivity and stability of the material by controlling a thickness and a structure of a coating layer through a coating process and a coating material.

A third purpose of the present application is to provide a positive electrode including the above composite material, so that the positive electrode can have excellent mechanical properties of lithium ion conductivity and has industrial application value.

A fourth purpose of the present application is to provide a negative electrode including the above composite material, so the negative electrode can have excellent mechanical properties of lithium ion conductivity and has industrial application value.

A fifth purpose of the present application is to provide an electrolyte including the above-mentioned composite material, so the electrolyte can have excellent mechanical properties of lithium ion conductivity and has industrial application value.

A sixth purpose of the present application is to provide a lithium ion battery containing oxide electrolyte coated nano-attapulgite composite material, which can effectively improve a performance of a lithium ion battery when used in the lithium ion battery.

In order to achieve the above purposes, technical solutions of the present application are as follows.

A composite material includes an oxide electrolyte and a nano-attapulgite, where the oxide electrolyte coats the nano-attapulgite.

Further, a coating layer of the oxide electrolyte has a thickness less than or equal to 20 µm, and a rod crystal of the nano-attapulgite has a length from 100 nm-50 µm and a width from 10 nm-120 nm.

Further, the nano-attapulgite is an organically modified natural nano-attapulgite and/or a lithium cation exchanged natural nano-attapulgite.

Further, the coating layer of the oxide electrolyte has a lithium ion conductivity of a magnitude from $10^{-5}$ S/cm to $10^{-3}$ S/cm.

Further, the oxide electrolyte is one or a combination of more than one of lithium phosphate, lithium titanate, lithium titanium phosphate, lithium titanium phosphate, lithium lanthanum titanate, lithium lanthanum tantalate, lithium germanium phosphate, lithium silicon phosphate, lithium aluminosilicate, boron trioxide doped lithium phosphate, lanthanum zirconium lithium oxide, lanthanum zirconium aluminum lithium oxide, niobium doped lithium lanthanum zirconium oxide, tantalum doped lithium lanthanum zirconium oxide and niobium doped lithium lanthanum zirconium oxide.

A preparation method of the composite material includes the following steps:
- step 1: as counted in molar parts, mixing 6.60-140.00 parts of lithium source, 0-237.60 parts of lanthanum source, 0-93.40 parts of boron source, 0-42.60 parts of zirconium source, 0-420.00 parts of phosphorus source, 0-424.20 parts of titanium source, 0-46.60 parts of aluminum source, 0-13.20 parts of tantalum source, 0-140.00 parts of germanium source, 0-140.00 parts of silicon source, 0-5.00 parts of niobium source and 0-5.20 parts of tungsten source to form a mixed aqueous solution, adding citric acid and 0.01-5 mass parts of nano-attapulgite into the mixed aqueous solution, where a molar ratio of metal cations to the citric acid is 1:1.2-1:2, stirring uniformly, adding ammonia water to keep a pH value of the solution at 7, continuing stirring until gel is formed, heating to 60-90° C., vacuumizing, obtaining a mixed system after the aqueous solution is completely volatilized, microwave heating the mixed system at 180-300° C. for reacting for 2-8 hours, cooling down, washing with a low boiling point reagent and vacuum drying to obtain a precursor powder A system; and
- step 2, heating the precursor powder A system to 400-500° C., performing heat preservation for 0.5-2 hours, sintering at 700-1300° C., performing heat preservation for 3-10 hours, and naturally cooling down to a room temperature to obtain a composite material, where the composite material is an oxide electrolyte coated nano-attapulgite composite material.

Further, the lithium source, lanthanum source, boron source, zirconium source, phosphorus source, titanium source, aluminum source, tantalum source, germanium source, silicon source, niobium source and tungsten source in step 1 are all water-soluble salts.

Further, the lithium source is one or a combination of more than one of lithium perchlorate, lithium chloride, lithium tetrafluoroborate, lithium bromide, lithium sulfate and lithium nitrate; the lanthanum source is lanthanum chloride, lanthanum sulfate, lanthanum nitrate and the like; the boron source is boric acid and/or sodium borate; the zirconium source is one or a combination of more than one of zirconium nitrate, zirconium sulfate and zirconium chloride; The phosphorus source is phosphoric acid; the titanium source is one or a combination of more than one of titanium sulfate, titanium oxysulfate, titanium tetrachloride and tetrabutyl titanate; the aluminum source is one or a combination of more than one of aluminum chloride, aluminum nitrate and aluminum sulfate; the tantalum source is tantalum pentachloride; the germanium source is diethyl germanium tetrachloride and/or trigermanium (3-methylbutyl) acetate; the silicon source is one or a combination of more than one of sodium silicate, potassium silicate and aluminum silicate; the niobium source is one or a combination of more than one of niobium pentachloride, niobium oxalate, niobium malate, niobium tartrate and niobium citrate; and the tungsten source is ammonium tungstate.

Further, a temperature of the vacuum drying in step 1 is 60-100° C., and a duration is 12-48 hours.

Further, the low boiling point reagent in step 1 is at least one of deionized water, ethanol and acetone.

A positive electrode including the above oxide electrolyte coated nano-attapulgite composite material.

A negative electrode including the above oxide electrolyte coated nano-attapulgite composite material.

An electrolyte including the above oxide electrolyte coated nano-attapulgite composite material.

A lithium ion battery, where at least one of a positive electrode, an electrolyte and a negative electrode of the lithium ion battery includes the oxide electrolyte coated nano-attapulgite composite material.

Further, the lithium ion battery includes a liquid lithium ion battery, a solid lithium ion battery, a semi-solid lithium ion battery and a solid-liquid mixed lithium battery.

The present application has the following beneficial effects.

The present application is different from traditional lithium conducting materials in that the oxide electrolyte coated nano-attapulgite composite material is prepared by adopting a coating method. Under certain reaction conditions, a rod-shaped oxide electrolyte coated nano-attapulgite structure is formed, and the oxide electrolyte on a surface of the structure has a good lithium conducting function, and the oxide electrolyte on the surface of the rod-shaped structure has a continuous lithium conducting structure, which can form a continuous rod-shaped lithium conducting channel in a lithium ion battery.

A natural attapulgite is a kind of crystalline hydrated magnesium aluminosilicate mineral, which has a unique layered chain structure, with lattice displacement in the structure thereof, and rod-shaped crystals are needle-shaped, fibrous-shaped or fiber-aggregate. The natural attapulgite has a rod-shaped crystal shape, with a rod crystal length of 1-5 um and a width of 20-70 nm, which is a natural nano-structured rod-shaped mineral material with stable performance and is a good carrier material.

The nano-attapulgite is an organically modified natural nano-attapulgite or a lithium cation exchanged natural nano-attapulgite, the oxide electrolyte is coated on a surface of the nano-attapulgite, which can form a layer of lithium ion channel on the surface of the nano-attapulgite. The lithium ion conductor coated nano-attapulgite has a rod-shaped nano-structure, especially in composite solid lithium ion electrolyte and solid lithium ion positive electrode, in which the oxide electrolyte coated nano-attapulgite structure forms an effective accumulation, which can improve a lithium ion conductivity in the composite solid lithium ion electrolyte and the solid lithium ion positive electrode, as well as improve mechanical properties of the composite solid lithium ion electrolyte and the solid lithium ion positive electrode, and has industrial application value.

At the same time, the present application can improve a compatibility of a coated nano-attapulgite with a negative electrode material, a composite solid lithium ion electrolyte and a solid lithium ion positive electrode in a certain range, and improve a lithium ion conductivity and stability of the material by controlling a thickness and a structure of a coating layer through a coating process and a coating material. The oxide electrolyte coated nano-attapulgite composite material adopted in the present application has a good application potential in a liquid lithium ion battery, a solid lithium ion battery, a semi-solid lithium ion battery and a solid-liquid mixed lithium battery.

DESCRIPTION OF EMBODIMENTS

Embodiment 1

An oxide electrolyte coats nano-attapulgite composite material, where a coating layer of the oxide electrolyte has a thickness less than or equal to 20 µm, a rod crystal of a nano-attapulgite has a length of 100 nm-50 µm and a width of 10 nm-120 nm, and the nano-attapulgite is an organically modified natural nano-attapulgite and/or a lithium cation exchanged natural nano-attapulgite.

Further, the organic modified natural nano-attapulgite and the lithium cation exchanged natural nano-attapulgite have been commercialized.

Further, the coating layer of the oxide electrolyte has a lithium ion conductivity of a magnitude from $10^{-5}$ S/cm to $10^{-3}$ S/cm.

Further, the oxide electrolyte is one or a combination of more than one of lithium phosphate, lithium titanate, lithium titanium phosphate, lithium titanium phosphate, lithium lanthanum titanate, lithium lanthanum tantalate, lithium germanium phosphate, lithium silicon phosphate, lithium aluminosilicate, boron trioxide doped lithium phosphate, lanthanum zirconium lithium oxide, lanthanum zirconium aluminum lithium oxide, niobium doped lithium lanthanum zirconium oxide, tantalum doped lithium lanthanum zirconium oxide and niobium doped lithium lanthanum zirconium oxide.

A preparation method of an oxide electrolyte coated nano-attapulgite composite material includes the following steps:

step 1: as counted in molar parts, mixing 6.60-140.00 parts of lithium source, 0-237.60 parts of lanthanum source, 0-93.40 parts of boron source, 0-42.60 parts of zirconium source, 0-420.00 parts of phosphorus source, 0-424.20 parts of titanium source, 0-46.60 parts of aluminum source, 0-13.20 parts of tantalum source, 0-140.00 parts of germanium source, 0-140.00 parts of silicon source, 0-5.00 parts of niobium source and 0-5.20 parts of tungsten source to form a mixed aqueous solution, adding citric acid and 0.01-5 mass parts of nano-attapulgite into the mixed aqueous solution, where a molar ratio of metal cations to the citric acid is 1:1.2-1:2, stirring uniformly, adding ammonia water to keep a pH value of the solution at 7, continuing stirring until gel is formed, heating to 60-90° C., vacuumizing, obtaining a mixed system after the aqueous solution is completely volatilized, microwave heating the mixed system at 180-300° C. for reacting for 2-8 hours, cooling down to a room temperature, washing with a low boiling point reagent and vacuum drying to obtain a precursor powder A system; and step 2, heating the precursor powder A system to 400-500° C., performing heat preservation for 0.5-2 hours to eliminate residual organic matters, sintering at 700-1300° C., performing heat preservation for 3-10 hours, and naturally cooling down to a room temperature to obtain the oxide electrolyte coated nano-attapulgite composite material.

Further, the lithium source, lanthanum source, boron source, zirconium source, phosphorus source, titanium source, aluminum source, tantalum source, germanium source, silicon source, niobium source and tungsten source in step 1 are all water-soluble salts.

Preferably, the lithium source is one or a combination of more than one of lithium perchlorate, lithium chloride, lithium tetrafluoroborate, lithium bromide, lithium sulfate and lithium nitrate; the lanthanum source is lanthanum chloride, lanthanum sulfate, lanthanum nitrate and the like; the boron source is boric acid and/or sodium borate; the zirconium source is one or a combination of more than one of zirconium nitrate, zirconium sulfate and zirconium chloride; the phosphorus source is phosphoric acid; the titanium source is one or a combination of more than one of titanium sulfate, titanium oxysulfate, titanium tetrachloride and tetrabutyl titanate; the aluminum source is one or a combination of more than one of aluminum chloride, aluminum nitrate and aluminum sulfate; the tantalum source is tantalum pentachloride; the germanium source is diethyl germanium tetrachloride and/or trigermanium (3-methylbutyl) acetate; the silicon source is one or a combination of more than one of sodium silicate, potassium silicate and aluminum silicate; the niobium source is one or a combination of more than one of niobium pentachloride, niobium oxalate, niobium malate, niobium tartrate and niobium citrate; and the tungsten source is ammonium tungstate.

Further, a temperature of the vacuum drying in step 1 is 60-100° C., and a duration is 12-48 hours.

Further, the low boiling point reagent in step 1 is at least one of deionized water, ethanol and acetone.

A positive electrode includes the above oxide electrolyte coated nano-attapulgite composite material.

In an embodiment, as counted in mass parts, 70-96 parts of positive active material, 1-10 parts of binder, 0-20 parts of lithium conducting material, 1-10 parts of conductive agent and 0.5-5 parts of oxide electrolyte coated nano-attapulgite composite material are uniformly mixed, and a positive electrode piece is formed through coating drying, where the positive active material includes one or a combination of more than one of lithium iron phosphate, lithium cobaltate, nickel cobalt manganese ternary battery material, lithium manganate, nickel cobalt aluminum ternary battery material and sulfur. The positive electrode piece can be used in a solid-liquid mixed lithium ion battery, a solid lithium ion battery and a semi-solid lithium ion battery.

A negative electrode includes the above oxide electrolyte coated nano-attapulgite composite material.

In an embodiment, as counted in mass parts, 10-20 parts of oxide electrolyte coated nano-attapulgite composite material, 0.5-5 parts of binder, 20-80 parts of lithium storage active material and 3-12 parts of conductive agent are uniformly mixed, then the mixture is coated on a copper-based current collector plated with the lithium storage active material, and then dried and pressed to prepare a composite negative electrode, where the lithium storage active material can be one or a combination of more than one of carbon material, metal bismuth, lithium metal, nitride, silicon-based material, tin-based oxide, stannate, tin-based alloy, antimony-based alloy, germanium-based alloy, aluminum-based alloy, lead-based alloy, titanium oxide, nano-transition metal oxide MO (M=Co, Ni, Cu, Fe), iron oxide, chromium oxide, molybdenum oxide and phosphide, and the negative electrode can be used in a liquid lithium ion battery, a solid lithium ion battery, and a semi-solid lithium ion battery.

An electrolyte includes the above oxide electrolyte coated nano-attapulgite composite material.

In an embodiment, as counted in mass parts, 80-100 parts of solid electrolyte or semi-solid electrolyte and 1-10 parts of oxide electrolyte coated nano-attapulgite composite material are uniformly mixed, and then the mixture is coated and pressed to prepare a solid electrolyte or a semi-solid electrolyte, where the solid electrolyte and semi-solid electrolyte include a sulfide system, an oxide system and a polymer system.

A lithium ion battery, where at least one of a positive electrode, an electrolyte, and a negative electrode of the lithium ion battery includes the oxide electrolyte coated nano-attapulgite composite material.

Preferably, the lithium ion battery includes a liquid lithium ion battery, a solid lithium ion battery, a semi-solid lithium ion battery and a solid-liquid mixed lithium battery.

The nano-attapulgite in the following example has a length of 5 μm and a width of 50 nm, and is a natural nano-attapulgite exchanged by lithium cations.

Example 1

A preparation method of an oxide electrolyte coated nano-attapulgite composite material includes the following steps:
- step 1: as counted in molar parts, mixing 140.00 parts of lithium nitrate, 420.00 parts of phosphoric acid and 280.00 parts of titanium sulfate are prepared to form a mixed aqueous solution, adding citric acid and 12.4 mass parts of nano-attapulgite into the mixed aqueous solution, where a molar ratio of metal cations to the citric acid is 1:1.2, adding ammonia water to keep a pH value of the solution at 7, continuing stirring until gel is formed, heating to 60° C., vacuumizing, obtaining a mixed system after the aqueous solution is completely volatilized, microwave heating the mixed system at 180° C. for reacting for 2 hours, cooling down to a room temperature, washing with deionized water and drying in vacuum at 60° C. for 12 hours to obtain a precursor powder A system; and
- step 2: heating the precursor powder A system to 400° C., performing heat preservation for 0.5 hour to eliminate residual organic matters, sintering at 700° C., performing heat preservation for 10 hours, and naturally cooling down to a room temperature to obtain the oxide electrolyte coated nano-attapulgite composite material, where the oxide electrolyte of the oxide electrolyte coated nano-attapulgite composite material is lithium titanium phosphate $LiTi_2(PO_4)_3$.

Applications of the oxide electrolyte coated nano-attapulgite composite material in a lithium ion battery include the following.

Applications of the oxide electrolyte coated nano-attapulgite composite material in a positive electrode of the lithium ion battery are as follows: as counted in mass parts, 70 parts of positive electrode active material, 5 parts of binder, 20 parts of lithium conductive material, 5 parts of conductive agent and 5 parts of oxide electrolyte coated nano-attapulgite composite material are uniformly mixed, and then the mixture is coated and dried to form a positive electrode piece, which can be used for a solid-liquid mixed lithium ion battery, a solid lithium ion battery and a semi-solid lithium ion battery, where the positive active material includes one or a combination of more than one of lithium iron phosphate, lithium cobaltate, nickel cobalt manganese ternary battery material, lithium manganate, nickel cobalt aluminum ternary battery material and sulfur.

In the present example, after 70 parts of lithium iron phosphate, 5 parts of PVDF, 20 parts of polyethylene oxide, 5 parts of conductive carbon black, and 5 parts of oxide electrolyte coated nano-attapulgite composite are uniformly mixed in 500 parts of acetonitrile and 200 parts of NMP, then the positive electrode piece in the example 1 is obtained after the mixture is coated on an aluminum foil and dried.

Applications of the oxide electrolyte coated nano-attapulgite composite material in a solid electrolyte and a semi-solid electrolyte of the lithium ion battery are as follows: as counted in mass parts, 100 parts of solid electrolyte or semi-solid electrolyte and 10 parts of oxide electrolyte coated nano-attapulgite composite material are uniformly mixed, and then the mixture is coated and pressed to prepare a solid electrolyte or a semi-solid electrolyte, where the solid electrolyte and the semi-solid electrolyte include a sulfide system, an oxide system and a polymer system.

In the present example, 20 parts of polyethylene oxide and 5 parts of oxide electrolyte coated nano-attapulgite composite are uniformly mixed in 100 parts of acetonitrile, and the solid electrolyte of example 1 is obtained after the mixture is coated and pressed.

Applications of the oxide electrolyte coated nano-attapulgite composite material in a negative electrode of the lithium ion battery are as follows: as counted in mass parts, 10 parts of oxide electrolyte coated nano-attapulgite composite material, 0.5 part of binder, 20 parts of lithium storage active material and 3 parts of conductive agent are uniformly mixed, then the mixture is coated on a copper-based current collector plated with the lithium storage active material, and then dried and pressed to prepare a composite negative electrode, where the lithium storage active material can be one or a combination of more than one of carbon material, metal bismuth, lithium metal, nitride, silicon-based material, tin-based oxide, stannate, tin-based alloy, antimony-based alloy, germanium-based alloy, aluminum-based alloy, lead-based alloy, titanium oxide, nano-transition metal oxide MO (M=Co, Ni, Cu, Fe), iron oxide, chromium oxide, molybdenum oxide and phosphide. The composite negative electrode can be used in a liquid lithium ion battery, a solid lithium ion battery and a semi-solid lithium ion battery.

In the present example, 10 parts of oxide electrolyte coated nano-attapulgite composite material, 0.3 part of polybutadiene-co-styrene rubber, 0.2 part of sodium carboxymethyl cellulose, 20 parts of silicon powder and 3 parts of conductive carbon black are uniformly mixed, then the mixture is coated on the copper-based current collector plated with a lithium storage active material, and then dried and pressed to obtain the composite negative electrode of example 1.

The positive electrode, the electrolyte and the negative electrode can be assembled into a secondary battery cell in a form of lamination, and the lithium ion battery of example 1 can be obtained after forming and sorting.

Comparative Example 1

After 70 parts of lithium iron phosphate, 5 parts of PVDF, 20 parts of polyethylene oxide and 5 parts of conductive carbon black are uniformly mixed in 500 parts of acetonitrile and 200 parts of NMP, then the positive electrode piece in the present comparative example is obtained after the mixture is coated on an aluminum foil and dried.

20 parts of polyethylene oxide is uniformly mixed in 100 parts of acetonitrile, and the solid electrolyte of the present comparative example is obtained after the mixture is coated and pressed.

0.3 part of polybutadiene-co-styrene rubber, 0.2 part of sodium carboxymethyl cellulose, 20 parts of silicon powder and 3 parts of conductive carbon black are uniformly mixed, then the mixture is coated on a copper-based current collector plated with a lithium storage active material, and then dried and pressed to obtain the composite negative electrode of the present example.

The positive electrode, the electrolyte and the negative electrode can be assembled into a secondary battery cell in a form of lamination, and the lithium ion battery of comparative example 1 can be obtained after forming and sorting.

Example 2

A preparation method of an oxide electrolyte coated nano-attapulgite composite material includes the following steps:

step 1, as counted in molar parts, mixing 140.00 parts of lithium sulfate, 60.00 parts of lanthanum nitrate, 35.00 parts of zirconium chloride and 5.00 parts of niobium pentachloride are prepared to form a mixed aqueous solution, adding citric acid and 4.2 mass parts of nano-attapulgite into the mixed aqueous solution, where a molar ratio of metal cations to citric acid is 1:1.6, adding ammonia water to keep a pH value of the solution at 7, continuing stirring until gel is formed, heating to 70° C., vacuumizing, obtaining a mixed system after the aqueous solution is completely volatilized, microwave heating the mixed system at 200° C. for reacting for 4 hours, cooling down to a room temperature, washing with ethanol and drying in vacuum at 90° C. for 24 hours to obtain a precursor powder A system; and step 2, heating the precursor powder A system to 490° C., performing heat preservation for 0.9 hour to eliminate residual organic matters, sintering at 900° C., performing heat preservation for 6 hours, and naturally cooling down to a room temperature to obtain the oxide electrolyte coated nano-attapulgite composite material, where the oxide electrolyte of the oxide electrolyte coated nano-attapulgite composite material is niobium doped lithium lanthanum zirconium oxide $Li_7La_3Zr_{1.75}Nb_{0.25}O_{12}$.

Applications of the oxide electrolyte coated nano-attapulgite composite material in a lithium ion battery include the following.

Applications of the oxide electrolyte coated nano-attapulgite composite material in a positive electrode of the lithium ion battery are as follows: as counted in mass parts, 96 parts of positive active material, 1 part of binder, 1 part of conductive agent and 0.5 part of oxide electrolyte coated nano-attapulgite composite material are uniformly mixed, and then the mixture is coated and dried to form a positive electrode piece, which can be used for a solid-liquid mixed lithium ion battery, a solid lithium ion battery and a semi-solid lithium ion battery; where the positive active material includes one or a combination of more than one of lithium iron phosphate, lithium cobaltate, nickel cobalt manganese ternary battery material, lithium manganate, nickel cobalt aluminum ternary battery material and sulfur.

In the present example, after 96 parts of lithium cobaltate, 1 part of PVDF, 1 part of polyethylene oxide, 1 part of carbon nano-tube, and 0.5 part of oxide electrolyte coated nano-attapulgite composite are uniformly mixed in 100 parts of NMP, then the positive electrode piece in the example 2 is obtained after the mixture is coated on an aluminum foil and dried.

Applications of the oxide electrolyte coated nano-attapulgite composite material in a solid electrolyte and a semi-solid electrolyte of the lithium ion battery are as follows: as counted in mass parts, 80 parts of solid electrolyte or semi-solid electrolyte and 1 part of oxide electrolyte coated nano-attapulgite composite material are uniformly mixed, and then the mixture is coated and pressed to prepare a solid electrolyte or a semi-solid electrolyte, where the solid electrolyte and the semi-solid electrolyte include a sulfide system, an oxide system and a polymer system.

In the present example, 80 parts of polymethylmethacrylate polymer gel electrolyte and 1 part of oxide electrolyte coated nano-attapulgite composite and 300 parts of acetonitrile are mixed uniformly, and the electrolyte of example 2 is obtained after the mixture is coated and pressed.

Applications of the oxide electrolyte coated nano-attapulgite composite material in a negative electrode of the lithium ion battery are as follows: as counted in mass parts, 15 parts of oxide electrolyte coated nano-attapulgite composite material, 5 parts of binder, 80 parts of lithium storage active material and 12 parts of conductive agent are uniformly mixed, then the mixture is coated on a copper-based current collector plated with the lithium storage active material, and then dried and pressed to prepare a composite negative electrode; where the lithium storage active materials are carbon material, metal bismuth, lithium metal, nitride, silicon-based material, tin-based oxide, stannate, tin-based alloy, antimony-based alloy, germanium-based alloy, aluminum-based alloy, lead-based alloy, titanium oxide, nano-transition metal oxide MO (M=Co, Ni, Cu, Fe), iron oxide, chromium oxide, molybdenum oxide or phosphide; the composite negative electrode can be used in a liquid lithium ion battery, a solid lithium ion battery and a semi-solid lithium ion battery.

In the present example, 15 parts of oxide electrolyte coated nano-attapulgite composite material, 5 parts of polyacrylate, 80 parts of silicon oxide and 12 parts of conductive carbon black are uniformly mixed, then the mixture is coated on the copper-based current collector plated with a lithium storage active material, and then dried and pressed to obtain the composite negative electrode of example 2.

The positive electrode, the electrolyte and the negative electrode can be assembled into a secondary battery cell in a form of lamination, and the lithium ion battery of example 2 can be obtained after forming and sorting.

Example 3

A preparation method of an oxide electrolyte coated nano-attapulgite composite material includes the following steps:

step 1, as counted in molar parts, mixing 140.00 parts of lithium chloride, 93.40 parts of boric acid, 420.00 parts of phosphoric acid, 70 parts of aluminum chloride and 140.00 parts of diethyl germanium tetrachloride are prepared to form a mixed aqueous solution, adding citric acid and 14.5 mass parts of nano-attapulgite into the mixed aqueous solution, where a molar ratio of metal cations to the citric acid is 1:1.8, adding ammonia water to keep a pH value of the solution at 7, continuing stirring until gel is formed, heating to 65° C., vacuumizing, obtaining a mixed system after the aqueous solution is completely volatilized, microwave heating the mixed system at 240° C. for reacting for 3 hours, cooling down to a room temperature, washing with acetone and drying in vacuum at 70° C. for 30 hours to obtain a precursor powder A system; and step 2, heating the precursor powder A system to 450° C., performing heat preservation for 1.2 hours to eliminate residual organic matters, sintering at 800° C., performing heat preservation for 4 hours, and naturally cooling down to a room temperature to obtain the oxide electrolyte coated nano-attapulgite composite material, where the oxide electrolyte of the oxide electrolyte coated nano-attapulgite composite material is boron doped lithium germanium aluminum phosphate $Li_{1.5}Al_{0.5}Ge_{1.5}(PO_4)_3$.

Applications of the oxide electrolyte coated nano-attapulgite composite material in a lithium ion battery include the following.

Applications of the oxide electrolyte coated nano-attapulgite composite material in a positive electrode of the lithium ion battery are as follows: as counted in mass parts, 80 parts of positive active material, 10 parts of binder, 10 parts of lithium conductive material, 10 parts of conductive agent and 3 parts of oxide electrolyte coated nano-attapulgite composite material are uniformly mixed, and then the mixture is coated and dried to form a positive electrode piece, which can be used for a solid-liquid mixed lithium ion battery, a solid lithium ion battery and a semi-solid lithium ion battery, where the positive active material includes one or a combination of more than one of lithium iron phosphate, lithium cobaltate, nickel cobalt manganese ternary battery material, lithium manganate, nickel cobalt aluminum ternary battery material and sulfur.

In the present example, 80 parts of Ni—Co—Mn ternary battery material, 10 parts of PVDF, 10 parts of LAGP oxide electrolyte, 10 parts of carbon nano-tubes, 3 parts of oxide electrolyte coated nano-attapulgite composite material and 200 parts of NMP are uniformly mixed, and then the mixture is coated and dried to obtain the positive electrode plate of example 3.

Applications of the oxide electrolyte coated nano-attapulgite composite material in a solid electrolyte and a semi-solid electrolyte of the lithium ion battery are as follows: as counted in mass parts, 90 parts of solid electrolyte or semi-solid electrolyte and 5 parts of oxide electrolyte coated nano-attapulgite composite material are uniformly mixed, and then the mixture is coated and pressed to prepare a solid electrolyte or a semi-solid electrolyte, where the solid electrolyte and the semi-solid electrolyte include a sulfide system, an oxide system and a polymer system.

In the present example, 90 parts of polycarbonate solid electrolyte and 5 parts of oxide electrolyte coated nano-attapulgite composite and 200 parts of acetonitrile are mixed uniformly, and the solid electrolyte of example 3 is obtained after the mixture is coated and pressed.

Applications of the oxide electrolyte coated nano-attapulgite composite material in a negative electrode of the lithium ion battery are as follows: as counted in mass parts, 18 parts of oxide electrolyte coated nano-attapulgite composite material, 4 parts of binder, 70 parts of lithium storage active material and 5 parts of conductive agent are uniformly mixed, and then the mixture is coated on a copper-based current collector plated with the lithium storage active material, and then dried and pressed to prepare a composite negative electrode; where the lithium storage active materials may be carbon material, metal bismuth, lithium metal, nitride, silicon-based material, tin-based oxide, stannate, tin-based alloy, antimony-based alloy, germanium-based alloy, aluminum-based alloy, lead-based alloy, titanium oxide, nano-transition metal oxide MO (M=Co, Ni, Cu, Fe), iron oxide, chromium oxide, molybdenum oxide and phosphide; the composite negative electrode can be used in a liquid lithium ion battery, a solid lithium ion battery and a semi-solid lithium ion battery.

In the present example, 18 parts of oxide electrolyte coated nano-attapulgite composite material, 4 parts of polyacrylic acid, 70 parts of graphite, 5 parts of carbon nano-tube and 100 parts of water are uniformly mixed, then the mixture is coated on the copper-based current collector plated with a lithium storage active material, and then dried and pressed to obtain the composite negative electrode of example 3.

The positive electrode, the electrolyte and the negative electrode can be assembled into a secondary battery cell in a form of lamination, and the lithium ion battery of example 3 can be obtained after forming and sorting.

Example 4

A preparation method of an oxide electrolyte coated nano-attapulgite composite material includes the following steps:

step 1, as counted in molar parts, mixing 6.60 parts of lithium bromide, 6.60 parts of aluminum nitrate, 6.60 parts of potassium silicate to form a mixed aqueous solution, adding citric acid and 0.1 mass part of nano-attapulgite into the mixed aqueous solution, where a molar ratio of metal cations to the citric acid is 1:1.5, adding ammonia water to keep a pH value of the solution at 7, continuing stirring until gel is formed, heating to 85° C., vacuumizing, obtaining a mixed system after the aqueous solution is completely volatilized, microwave heating the mixed system at 280° C. for reacting for 5 hours, cooling down to a room temperature, washing with mixed reagent of deionized water and ethanol and drying in vacuum at 85° C. for 40 hours to obtain a precursor powder A system; and step 2, heating the precursor powder A system to 470° C., performing heat preservation for 1 hour to eliminate residual organic matters, sintering at 1100° C., performing heat preservation for 5 hours, and naturally cooling down to a room temperature to obtain an oxide electrolyte coated nano-attapulgite composite material, where the oxide electrolyte of the oxide electrolyte coated nano-attapulgite composite material is lithium aluminosilicate $LiAlSiO_4$.

Applications of the oxide electrolyte coated nano-attapulgite composite material in a lithium ion battery include the following.

Applications of the oxide electrolyte coated nano-attapulgite composite material in a positive electrode of the lithium ion battery are as follows: as counted in mass parts, 90 parts of positive active material, 5 parts of binder, 10 parts of lithium conductive material, 5 parts of conductive agent and 4 parts of oxide electrolyte coated nano-attapulgite composite material are uniformly mixed, and then the mixture is coated and dried to form a positive electrode piece, which can be used for a solid-liquid mixed lithium ion battery, a solid lithium ion battery and a semi-solid lithium ion battery, where the positive active material includes one or a combination of more than one of lithium iron phosphate, lithium cobaltate, nickel cobalt manganese ternary battery material, lithium manganate, nickel cobalt aluminum ternary battery material and sulfur.

In the present example, 90 parts of Ni—Co—Al ternary battery material, 5 parts of PVDF, 10 parts of polyoxyethylene, 5 parts of conductive agent, 4 parts of oxide electrolyte coated nano-attapulgite composite material, 200 parts of acetonitrile and 200 parts of NMP are uniformly mixed, and then the mixture is coated and dried to obtain the positive electrode plate of example 4.

Applications of the oxide electrolyte coated nano-attapulgite composite material in a solid electrolyte and a semi-solid electrolyte of the lithium ion battery are as follows: as counted in mass parts, 85 parts of solid electrolyte or semi-solid electrolyte and 3 parts of oxide electrolyte coated nano-attapulgite composite material are uniformly mixed, and then the mixture is coated and pressed to prepare a solid electrolyte or a semi-solid electrolyte, where the solid electrolyte and semi-solid electrolyte include a sulfide system, an oxide system and a polymer system.

In the present example, 80 parts of $LiAlSiO_4$ solid electrolyte, 5 parts of polyoxyethylene, 3 parts of oxide electrolyte coated nano-attapulgite composite and 100 parts of acetonitrile are uniformly mixed, and the solid electrolyte of example 4 is obtained after the mixture is coated and pressed.

Applications of oxide electrolyte coated nano-attapulgite composite material in a negative electrode of the lithium ion battery are as follows: as counted in mass parts, 16 parts of oxide electrolyte coated nano-attapulgite composite material, 3 parts of binder, 60 parts of lithium storage active material and 10 parts of conductive agent are uniformly mixed, and then the mixture is coated on a copper-based current collector plated with the lithium storage active material, and then dried and pressed to prepare a composite negative electrode; where the lithium storage active materials may be one or a combination of more than one of carbon material, metal bismuth, lithium metal, nitride, silicon-based material, tin-based oxide, stannate, tin-based alloy, antimony-based alloy, germanium-based alloy, aluminum-based alloy, lead-based alloy, titanium oxide, nano-transition metal oxide MO (M=Co, Ni, Cu, Fe), iron oxide, chromium oxide, molybdenum oxide and phosphide; the composite negative electrode can be used in a liquid lithium ion battery, a solid lithium ion battery and a semi-solid lithium ion battery.

In the present example, 16 parts of oxide electrolyte coated nano-attapulgite composite material, 3 parts of polyethylene glycol methacrylate, 60 parts of lithium metal powder and 10 parts of conductive carbon black are uniformly mixed, and then the mixture is coated on the copper-based current collector plated with a lithium storage active material, and then dried and pressed to obtain the composite negative electrode of example 4.

The positive electrode, the electrolyte and the negative electrode can be assembled into a secondary battery cell in a form of lamination, and the lithium ion battery of example 4 can be obtained after forming and sorting.

Example 5

A preparation method of an oxide electrolyte coated nano-attapulgite composite material includes the following steps:

step 1, as counted in molar parts, mixing 128.00 parts of lithium perchlorate, 60 parts of lanthanum sulfate, 28 parts of zirconium nitrate and 12 parts of tantalum pentachloride to form a mixed aqueous solution, adding citric acid and 8 mass parts of nano-attapulgite into the mixed aqueous solution, where a molar ratio of metal cations to citric acid is 1:2, adding ammonia water to keep a pH value of the solution at 7, continuing stirring until gel is formed, heating to 90° C., vacuumizing, obtaining a mixed system after the aqueous solution is completely volatilized, microwave heating the mixed system at 300° C. for reacting for 8 hours, cooling down to a room temperature, washing with deionized water and drying in vacuum at 100° C. for 48 hours to obtain a precursor powder A system; and step 2, heating the precursor powder A system to 500° C., performing heat preservation for 2 hours to eliminate residual organic matters, sintering at 1300° C., performing heat preservation for 3 hours, and naturally cooling down to a room temperature to obtain an oxide electrolyte coated nano-attapulgite composite material. The oxide electrolyte of the oxide electrolyte coated nano-attapulgite composite material is tantalum doped lithium lanthanum zirconium oxygen $Li_{6.4}La_3Zr_{1.4}Ta_{0.6}O_{12}$.

Applications of the oxide electrolyte coated nano-attapulgite composite material in a lithium ion battery include the following.

Applications of the oxide electrolyte coated nano-attapulgite composite material in a positive electrode of the lithium ion battery are as follows: as counted in mass parts, 90 parts of positive electrode active material, 8 parts of binder, 15 parts of lithium conductive material, 8 parts of conductive agent and 5 parts of oxide electrolyte coated nano-attapulgite composite material are uniformly mixed, and then the mixture is coated and dried to form a positive electrode piece, which can be used for a solid-liquid mixed lithium ion battery, a solid lithium ion battery and a semi-solid lithium ion battery, where the positive electrode active material includes one or a combination of more than one of lithium iron phosphate, lithium cobaltate, nickel cobalt manganese ternary battery material, lithium manganate, nickel cobalt aluminum ternary battery material and sulfur.

In the present example, after 90 parts of lithium manganate, 8 parts of PVDF, 15 parts of $Li_{6.4}La_3Zr_{1.4}Ta_{0.6}O_{12}$, 8 parts of carbon nano-tube, and 5 parts of oxide electrolyte coated nano-attapulgite composite are uniformly mixed in 50 parts of NMP, the positive electrode piece in the example 5 is obtained after the mixture is coated and dried.

Applications of the oxide electrolyte coated nano-attapulgite composite material in a solid electrolyte and a semi-solid electrolyte of the lithium ion battery are as follows: as counted in mass parts, 95 parts of solid electrolyte or semi-solid electrolyte and 4 parts of oxide electrolyte coated nano-attapulgite composite material are uniformly mixed, and then the mixture is coated and pressed to prepare a solid electrolyte or a semi-solid electrolyte, where the solid electrolyte and the semi-solid electrolyte include a sulfide system, an oxide system and a polymer system.

In the present example, 95 parts of polyethylene glycol methyl methacrylate and 4 parts of oxide electrolyte coated nano-attapulgite composite material and 50 parts of acetonitrile are mixed uniformly, and the electrolyte of example 5 is prepared after the mixture is coated and pressed.

Applications of the oxide electrolyte coated nano-attapulgite composite material in a negative electrode of the lithium ion battery are as follows: as counted in mass parts, 20 parts of oxide electrolyte coated nano-attapulgite composite material, 5 parts of binder, 80 parts of lithium storage active material and 8 parts of conductive agent are uniformly mixed, the mixture is coated on a copper-based current collector plated with the lithium storage active material, and hen dried and pressed to prepare a composite negative electrode; where the lithium storage active materials may be one or a combination of more than one of carbon material, metal bismuth, lithium metal, nitride, silicon-based material, tin-based oxide, stannate, tin-based alloy, antimony-based alloy, germanium-based alloy, aluminum-based alloy, lead-based alloy, titanium oxide, nano-transition metal oxide MO (M=Co, Ni, Cu, Fe), iron oxide, chromium oxide, molybdenum oxide and phosphide; the composite negative electrode can be used in a liquid lithium ion battery, a solid lithium ion battery and a semi-solid lithium ion battery.

In the present example, 20 parts of oxide electrolyte coated nano-attapulgite composite material, 5 parts of lithium polyacrylate, 60 parts of silicon oxide, 20 parts of lithium powder lithium storage active material and 8 parts of conductive carbon black are uniformly mixed, then the mixture is coated on the copper-based current collector plated with a lithium storage active material, and then dried and pressed to obtain the composite negative electrode of example 5.

The positive electrode, the electrolyte and the negative electrode can be assembled into a secondary battery cell in a form of lamination, and the lithium ion battery of example 5 can be obtained after forming and sorting.

Example 6

A preparation method of an oxide electrolyte coated nano-attapulgite composite material includes the following steps:
step 1, as counted in molar parts, mixing 135.00 parts of lithium tetrafluoroborate, 60.00 parts of lanthanum chloride, 35.00 parts of zirconium sulfate and 5.00 parts of ammonium tungstate to form a mixed aqueous solution, adding citric acid and 3 mass parts of nano-attapulgite into the mixed aqueous solution, where a molar ratio of metal cations to the citric acid is 1:1.9, adding ammonia water to keep a pH value of the solution at 7, continuing stirring until gel is formed, heating to 70° C., vacuumizing, obtaining a mixed system after the aqueous solution is completely volatilized, microwave heating the mixed system at 190° C. for reacting for 7 hours, cooling down to a room temperature, washing with ethanol and drying in vacuum at 80° C. for 30 hours to obtain a precursor powder A system; and
step 2: heating the precursor powder A system to 480° C., performing heat preservation for 0.8 hour to eliminate residual organic matters, sintering at 1200° C., performing heat preservation for 8 hours, and naturally cooling down to a room temperature to obtain the oxide electrolyte coated nano-attapulgite composite material, where the oxide electrolyte of the oxide electrolyte coated nano-attapulgite composite material is tungsten tantalum doped lithium lanthanum zirconium oxygen $Li_{6.75}La_3Zr_{1.75}W_{0.25}O_{12}$.

Applications of the oxide electrolyte coated nano-attapulgite composite material in a lithium ion battery include the following.

Applications of the oxide electrolyte coated nano-attapulgite composite material in a positive electrode of the lithium ion battery are as follows: as counted in mass parts, 85 parts of positive active material, 9 parts of binder, 8 parts of lithium conductive material, 9 parts of conductive agent and 4 parts of oxide electrolyte coated nano-attapulgite composite material are uniformly mixed, and then the mixture is coated and dried to form a positive electrode piece, which can be used for a solid-liquid mixed lithium ion battery, a solid lithium ion battery and a semi-solid lithium ion battery, where the positive active material includes one or a combination of more than one of lithium iron phosphate, lithium cobaltate, nickel cobalt manganese ternary battery material, lithium manganate, nickel cobalt aluminum ternary battery material and sulfur.

In the present example, 85 parts of Ni—Co—Mn ternary material, 9 parts of PVDF, 8 parts of LLZO, 9 parts of carbon nano-tubes, 4 parts of oxide electrolyte coated nano-attapulgite composite material are uniformly mixed, and the mixture is coated and dried to obtain the positive electrode plate of example 6.

Applications of the oxide electrolyte coated nano-attapulgite composite material in a solid electrolyte and a semi-solid electrolyte of the lithium ion battery are as follows: as counted in mass parts, 95 parts of solid electrolyte or semi-solid electrolyte and 8 parts of oxide electrolyte coated nano-attapulgite composite material are uniformly mixed, and then the mixture is coated and pressed to prepare a solid electrolyte or a semi-solid electrolyte; where the solid electrolyte and the semi-solid electrolyte include a sulfide system, an oxide system and a polymer system.

In the present example, 80 parts of polyethylene glycol methyl methacrylate and 15 parts of polyoxyethylene, 8 parts of oxide electrolyte coated nano-attapulgite composite material and 500 parts of acetonitrile are mixed uniformly, and the mixture is coated and pressed to prepare the solid electrolyte of example 6.

Applications of oxide electrolyte coated nano-attapulgite composite material in a negative electrode of the lithium ion battery: as counted in mass parts, 12 parts of oxide electrolyte coated nano-attapulgite composite material, 3 parts of binder, 50 parts of lithium storage active material and 10 parts of conductive agent are uniformly mixed, then the mixture is coated on a copper-based current collector plated with the lithium storage active material, and then dried and pressed to prepare a composite negative electrode; where the lithium storage active materials may be one or a combination of more than one of carbon material, metal bismuth, lithium metal, nitride, silicon-based material, tin-based oxide, stannate, tin-based alloy, antimony-based alloy, germanium-based alloy, aluminum-based alloy, lead-based alloy, titanium oxide, nano-transition metal oxide MO (M=Co, Ni, Cu, Fe), iron oxide, chromium oxide, molybdenum oxide and phosphide; the composite negative electrode can be used in a liquid lithium ion battery, a solid lithium ion battery and a semi-solid lithium ion battery.

In the present example, 12 parts of oxide electrolyte coated nano-attapulgite composite material, 3 parts of polyacrylic acid, 40 parts of silicon, 10 parts of lithium metal powder and 10 parts of conductive carbon black are uniformly mixed, then the mixture is coated on the copper-based current collector plated with a lithium storage active material, and then dried and pressed to obtain the composite negative electrode of example 6.

The positive electrode, the electrolyte and the negative electrode can be assembled into a secondary battery cell in a form of lamination, and the lithium ion battery of example 6 can be obtained after forming and sorting.

Example 7

A preparation method of an oxide electrolyte coated nano-attapulgite composite material includes the following steps:
step 1, as counted in molar parts, mixing 140.00 parts of lithium nitrate, 60.00 parts of lanthanum nitrate and 60.00 parts of zirconium chloride to form a mixed aqueous solution, adding citric acid and 10.5 mass parts of nano-attapulgite into the mixed aqueous solution, where a molar ratio of metal cations to the citric acid is 1:2, adding ammonia water to keep a pH value of the solution at 7, continuing stirring until gel is formed, heating to 80° C., vacuumizing, obtaining a mixed system after the aqueous solution is completely volatilized, microwave heating the mixed system at 290° C. for reacting for 6 hours, cooling down to a room temperature, washing with deionized water and drying in vacuum at 75° C. for 36 hours to obtain a precursor powder A system; and step 2: heating the precursor powder A system to 460° C., performing heat preservation for 1.8 hour to eliminate residual organic matters, sintering at 1000° C., performing heat preservation for 9 hours, and naturally cooling down to a room temperature to obtain the oxide electrolyte coated nano-attapulgite, where the oxide electrolyte of the oxide electrolyte coated nano-attapulgite composite material is lithium lanthanum zirconium oxygen $Li_7La_3Zr_2O_{12}$.

Applications of the oxide electrolyte coated nano-attapulgite composite material in a lithium ion battery include the following:

Applications of the oxide electrolyte coated nano-attapulgite composite material in a positive electrode of the lithium ion battery are as follows: counted in mass parts, 75 parts of positive active material, 4 parts of binder, 6 parts of conductive agent, 4 parts of conductive agent and 2 parts of oxide electrolyte coated nano-attapulgite composite material are uniformly mixed, and then the mixture is coated and dried to form a positive electrode piece, which can be used for a solid-liquid mixed lithium ion battery, a solid lithium ion battery and a semi-solid lithium ion battery; where the positive active material includes one or a combination of more than one of lithium iron phosphate, lithium cobaltate, nickel cobalt manganese ternary battery material, lithium manganate, nickel cobalt aluminum ternary battery material and sulfur.

In the present example, 50 parts of lithium cobaltate, 25 parts of Ni—Co—Mn ternary battery material, 4 parts of PVDF, 6 parts of $Li_7La_3Zr_2O_{12}$, 4 parts of conductive carbon black, 2 parts of oxide electrolyte coated nano-attapulgite composite material and 200 parts of NMP are uniformly mixed, then the mixture is coated and dried to obtain the positive electrode piece in the example 7.

Applications of the oxide electrolyte coated nano-attapulgite composite material in a solid electrolyte and a semi-solid electrolyte of lithium ion battery are as follows: as counted in mass parts, 90 parts of solid electrolyte or semi-solid electrolyte and 6 parts of oxide electrolyte coated nano-attapulgite composite material are uniformly mixed, and then the mixture is coated and pressed to prepare a solid electrolyte or a semi-solid electrolyte, where the solid electrolyte and the semi-solid electrolyte include a sulfide system, an oxide system and a polymer system.

In the present example, 90 parts of $Li_7La_3Zr_2O_{12}$ and 6 parts of oxide electrolyte coated nano-attapulgite composite material are uniformly mixed, and then the mixture is coated and pressed to obtain the solid electrolyte of example 7.

Applications of oxide electrolyte coated nano-attapulgite composite material in a negative electrode of the lithium ion battery are as follows: as counted in mass parts, 15 parts of oxide electrolyte coated nano-attapulgite composite material, 2 parts of binder, 40 parts of lithium storage active material and 5 parts of conductive agent are uniformly mixed, then the mixture is coated on a copper-based current collector plated with the lithium storage active material, and drying and pressing to prepare a composite negative electrode; where the lithium storage active materials may be one or a combination of more than one of carbon material, metal bismuth, lithium metal, nitride, silicon-based material, tin-based oxide, stannate, tin-based alloy, antimony-based alloy, germanium-based alloy, aluminum-based alloy, lead-based alloy, titanium oxide, nano-transition metal oxide MO (M=Co, Ni, Cu, Fe), iron oxide, chromium oxide, molybdenum oxide and phosphide; the composite negative electrode can be used in a liquid lithium ion battery, a solid lithium ion battery and a semi-solid lithium ion battery.

In the present example, 15 parts of oxide electrolyte coated nano-attapulgite composite material, 2 parts of binder, 20 parts of lithium aluminum alloy and 5 parts of carbon nano-tube are uniformly mixed, then the mixture is coated on the copper-based current collector plated with a lithium storage active material, and then dried and pressed to obtain the composite negative electrode of example 7.

The positive electrode, the electrolyte and the negative electrode can be assembled into a secondary battery cell in a form of lamination, and the lithium ion battery of example 7 can be obtained after forming and sorting.

Test Example

1. A room temperature conductivity and a lithium ion migration number of the oxide electrolyte coated nano-attapulgite composite material prepared in examples 1-7 and commercial polymer polyoxyethylene electrolytes are tested, and the test results are shown in the following table.

Test method for room temperature ionic conductivity: the electrolytes of examples 1-7 and the comparative polyethylene oxide electrolyte are assembled into stainless steel/electrolyte/stainless steel buckle, and the alternating current impedance test is carried out with CHE06 model in Chenhua Electrochemical Workstation, and the room temperature ionic conductivity is obtained by using a calculation formula of conductivity=thickness/(impedance*contact area).

Test method for lithium ion migration number: a combination method of an alternating current impedance method and a constant current method is mainly used to test the conductivity, and the alternating current impedance test is carried out in with CHE06 Chenhua Electrochemistry Workstation.

| Numeral | Room temperature ion conductivity (S/cm) | Lithium ion migration number |
|---|---|---|
| Polyoxyethylene | $1.16 \times 10^{-5}$ | 0.32 |
| Example 1 | $3.14 \times 10^{-4}$ | 0.97 |
| Example 2 | $2.19 \times 10^{-4}$ | 0.96 |
| Example 3 | $9.76 \times 10^{-4}$ | 0.94 |
| Example 4 | $8.64 \times 10^{-5}$ | 0.96 |
| Example 5 | $1.34 \times 10^{-4}$ | 0.98 |
| Example 6 | $1.17 \times 10^{-4}$ | 0.96 |
| Example 7 | $2.28 \times 10^{-4}$ | 0.93 |

It can be seen from the results in the above table that the conventional polyethylene oxide polymer electrolyte has a conductivity of $1.36 \times 10^{-5}$ S/cm at room temperature, and the oxide electrolyte coated nano-attapulgite composite material of the present application has a conductivity of about $10^{-4}$ S/cm and a lithium ion migration number close to 1 at room temperature, and a superior room temperature lithium ion conductivity compared with the polyethylene oxide.

2. The solid electrolyte in example 1 and the solid electrolyte in comparative example 1 are tested in terms of electrochemical window, room temperature ionic conductivity, lithium ion migration number and mechanical properties, and the test results are shown in the following table, where the test methods for the room temperature ionic conductivity and the lithium ion migration number are the same as above.

Test method for electrochemical window: stainless steel/electrolyte/lithium sheet is composed, and a stability of electrochemical window is tested with CHE06 model in Chenhua Electrochemical Workstation.

Test method for mechanical properties can be referred to in GB/T 1040.1-2018. Battery cycle performance test: a blue electric test cabinet is used to test the charge and discharge of the prepared lithium ion battery.

| | Room temperature ion conductivity (S/cm) | Lithium ion migration number | Electrochemical window (V) | Tensile strength (MPa) |
|---|---|---|---|---|
| Example 1 | $3.14 \times 10^{-4}$ | 0.97 | 4.25 | 1.2 |
| Comparative example 1 | $1.21 \times 10^{-5}$ | 0.31 | 3.80 | 0.5 |

It can be seen from the results in the above table that, by comparing the conductivity, the lithium ion migration number, the electrochemical window and the tensile strength of the solid electrolytes of comparative example 1 and example 1 at room temperature, it can be seen that the addition of the oxide electrolyte coated nano-attapulgite composite material of example 1 can effectively improve the conductivity, the lithium ion migration number, the electrochemical window and the mechanical properties of the solid electrolyte.

The conductivity, the lithium ion migration number, the electrochemical window and the mechanical properties of the solid electrolytes in examples 2-7 are equivalent to corresponding parameters of the solid electrolyte in example 1.

3. The solid positive electrode in example 1 and the solid positive electrode in comparative example 1 are assembled into lithium ion batteries with polyethylene oxide solid electrolyte and lithium metal, respectively, and the prepared lithium ion batteries are subjected to 1 C/1 C, 2 C/2, 5 C/5 C, 10 C/10 C and 1 C/1 C rate charge and discharge tests by using a blue electric test cabinet.

Figure 1:
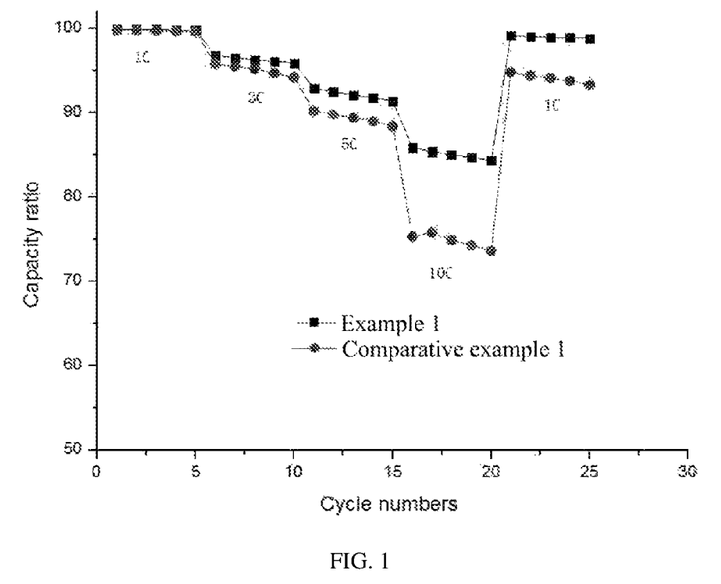
FIG. 1 is a rate charge-discharge diagram of lithium ion batteries including solid positive electrodes in example 1 and comparative example 1.

FIG. 1 is a rate charge-discharge diagram of lithium ion batteries including solid positive electrodes in example 1 and comparative example 1.

It can be seen from FIG. 1 that the battery assembled with the solid positive electrode prepared in comparative example 1 and the battery assembled with the solid positive electrode prepared in example 1 are cycled at rates of 1 C, 3 C, 5 C and 10 C, and the performance of the battery assembled with the solid positive electrode prepared in example 1 is obviously better than the performance of the battery assembled with the solid positive electrode prepared in comparative example 1. Therefore, the addition of the oxide electrolyte coated nano-attapulgite composite material in example 1 can effectively improve the lithium ion transmission in the solid positive electrode and enhance the rate performance of the battery.

The rate charge and discharge performance of the lithium ion batteries assembled with the solid positive electrode, polyethylene oxide solid electrolyte and lithium metal in examples 2-7 is equivalent to the performance of the lithium ion battery with the solid positive electrode of example 1 in FIG. 1.

4. The cycle performance of the lithium ion batteries in example 1 and comparative example 1 are tested at a rate of 0.5 C by using a blue electric test cabinet.

Figure 2:
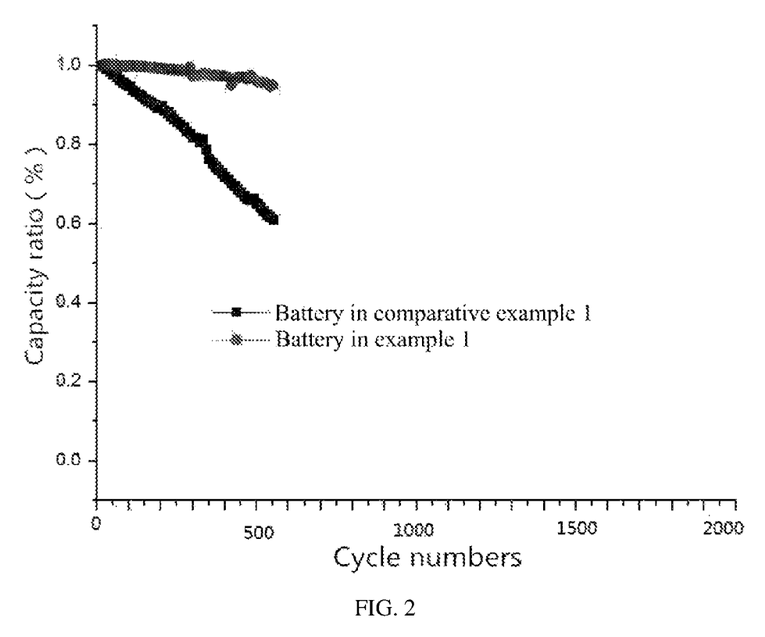
FIG. 2 is a cyclic charge-discharge diagram of lithium ion batteries in example 1 and comparative example 1.

FIG. 2 is a cyclic charge-discharge diagram of lithium ion batteries in example 1 and comparative example 1.

It can be seen from FIG. 2 that the battery of comparative example 1 and the battery of example 1 are cycled at a rate of 0.5 C, and the performance of the battery of example 1 is obviously better than the performance of comparative example 1. Therefore, the addition of the oxide electrolyte coated nano-attapulgite composite material in example 1 can effectively improve the lithium ion transmission in the lithium ion battery and enhance the cycle performance of the battery.

The cycle performance of the lithium ion batteries in examples 2 to 7 is equivalent to the cycle performance of the lithium ion battery in example 1.

For the oxide electrolyte coated nano-attapulgite structure in the present application, the oxide electrolyte coated attapulgite structure with high lithium ion conductivity and stable performance can be obtained by designing the coated oxide electrolyte, and the oxide electrolyte coated rod crystal structure has a better lithium ion conductivity at a microscopic level, and has a good application prospect in electrolytes and positive electrodes of the solid lithium ion battery and the semi-solid lithium ion battery.

Finally, it should be noted that the above examples are only used to illustrate technical solutions of the present application, but not to limit it; although the application has been described in detail with reference to the previously mentioned examples, those ordinary skilled in the art should understand that the technical solutions described in the previously mentioned examples can still be modified, or some or all of the technical features can be equivalently substituted; however, the modifications or substitutions do not make the essence of the corresponding technical solutions deviate from the scope of the technical solutions of each example of the present application.

What is claimed is:

1. A composite material for a lithium ion battery, comprising an oxide electrolyte and a nano-attapulgite, wherein the oxide electrolyte coats the nano-attapulgite, and the composite material is applied to at least one of a positive electrode, a solid or semi-solid electrolyte, and a negative electrode of the lithium ion battery;
    wherein a coating layer of the oxide electrolyte forms a layer of lithium ion channel on a surface of the nano-attapulgite, and has a lithium ion conductivity of a magnitude from $10^{-5}$ S/cm to $10^{-3}$ S/cm, wherein the coating layer is sintered to the nano-attapulgite.

2. The composite material according to claim 1, wherein the coating layer of the oxide electrolyte has a thickness less than or equal to 20 μm, a rod crystal of the nano-attapulgite has a length of 100 nm-50 μm and a width of 10 nm-120 nm.

3. The composite material according to claim 1, wherein the nano-attapulgite is at least one of an organically modified natural nano-attapulgite and a lithium cation exchanged natural nano-attapulgite.

4. The composite material according to claim 1, wherein the oxide electrolyte is one or a combination of more than one of lithium phosphate, lithium titanate, lithium titanium phosphate, lithium titanium phosphate, lithium lanthanum titanate, lithium lanthanum tantalate, lithium germanium phosphate, lithium silicon phosphate, lithium aluminosilicate, boron trioxide doped lithium phosphate, lanthanum zirconium lithium oxide, lanthanum zirconium aluminum lithium oxide, niobium doped lithium lanthanum zirconium oxide, tantalum doped lithium lanthanum zirconium oxide and niobium doped lithium lanthanum zirconium oxide.

5. A preparation method of the composite material according to claim 1, comprising the following steps:

step 1: as counted in molar parts, mixing 6.60-140.00 parts of lithium source, 0-237.60 parts of lanthanum source, 0-93.40 parts of boron source, 0-42.60 parts of zirconium source, 0-420.00 parts of phosphorus source, 0-424.20 parts of titanium source, 0-46.60 parts of aluminum source, 0-13.20 parts of tantalum source, 0-140.00 parts of germanium source, 0-140.00 parts of silicon source, 0-5.00 parts of niobium source and 0-5.20 parts of tungsten source to form a mixed aqueous solution, adding citric acid and 0.01-5 mass parts of nano-attapulgite into the mixed aqueous solution, wherein a molar ratio of metal cations to the citric acid is 1:1.2-1:2, stirring uniformly, adding ammonia water to keep a pH value of the mixed aqueous solution at 7, continuing stirring until gel is formed, heating to 60-90° C., vacuumizing, obtaining a mixed system after the mixed aqueous solution is completely volatilized, microwave heating the mixed system at 180-300° C. for reacting for 2-8 hours, cooling down, washing with a low boiling point reagent and vacuum drying to obtain a precursor powder A system; and step 2, heating the precursor powder A system to 400-500° C., performing heat preservation for 0.5-2 hours, sintering at 700-1300° C., performing heat preservation for 3-10 hours, and naturally cooling down to a room temperature to obtain the composite material, wherein the composite material is the oxide electrolyte coated nano-attapulgite composite material.

6. The preparation method of the composite material according to claim 5, wherein the lithium source, lanthanum source, boron source, zirconium source, phosphorus source, titanium source, aluminum source, tantalum source, germanium source, silicon source, niobium source and tungsten source in step 1 are all water-soluble salts.

7. The preparation method of the composite material according to claim 5, wherein the lithium source is one or a combination of more than one of lithium perchlorate, lithium chloride, lithium tetrafluoroborate, lithium bromide, lithium sulfate and lithium nitrate; the lanthanum source is lanthanum chloride, lanthanum sulfate, lanthanum nitrate and the like; the boron source is at least one of boric acid and sodium borate; the zirconium source is one or a combination of more than one of zirconium nitrate, zirconium sulfate and zirconium chloride; the phosphorus source is phosphoric acid; the titanium source is one or a combination of more than one of titanium sulfate, titanium oxysulfate, titanium tetrachloride and tetrabutyl titanate; the aluminum source is one or a combination of more than one of aluminum chloride, aluminum nitrate and aluminum sulfate; the tantalum source is tantalum pentachloride; the germanium source is at least one of diethyl germanium tetrachloride and trigermanium (3-methylbutyl) acetate; the silicon source is one or a combination of more than one of sodium silicate, potassium silicate and aluminum silicate; the niobium source is one or a combination of more than one of niobium pentachloride, niobium oxalate, niobium malate, niobium tartrate and niobium citrate; and the tungsten source is ammonium tungstate.

8. The preparation method of the composite material according to claim 5, wherein a temperature of the vacuum drying in step 1 is 60-100° C., and a duration is 12-48 hours.

9. The preparation method of the composite material according to claim 5, wherein the low boiling point reagent in step 1 is at least one of deionized water, ethanol and acetone.

10. A positive electrode, comprising the composite material according to claim 1.

11. A negative electrode, comprising the composite material according to claim 1.

12. A solid electrolyte, comprising the composite material according to claim 1.

13. A lithium ion battery, wherein at least one of a positive electrode, an electrolyte and a negative electrode of the lithium ion battery comprises the composite material according to claim 1.

14. The lithium ion battery according to claim 13, comprising at least one of a liquid lithium ion battery, a solid lithium ion battery, a semi-solid lithium ion battery and a solid-liquid mixed lithium battery.

15. A semi-solid electrolyte, comprising the composite material according to claim 1.

* * * * *